US007631675B2

(12) United States Patent  (10) Patent No.: US 7,631,675 B2
Ikegami  (45) Date of Patent: Dec. 15, 2009

(54) PNEUMATIC TIRE WITH TREAD HAVING CIRCUMFERENTIAL GROOVES AND ARCUATE GROOVES

(75) Inventor: Tetsuo Ikegami, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/277,082

(22) Filed: Nov. 24, 2008

(65) Prior Publication Data

US 2009/0178745 A1  Jul. 16, 2009

(30) Foreign Application Priority Data

Jan. 15, 2008  (JP)  ............... 2008-005568

(51) Int. Cl.
*B60C 11/03*  (2006.01)
(52) U.S. Cl. .............. 152/209.2; 152/209.8; 152/209.9; 152/209.18; 152/903
(58) Field of Classification Search ............. 152/209.8, 152/209.9, 209.18, 209.28, 903, 209.2; D12/505–532
See application file for complete search history.

(56) References Cited

U.S. PATENT DOCUMENTS

| | | | | | |
|---|---|---|---|---|---|
| 4,479,525 | A | * | 10/1984 | Graas | ............... 152/209.8 |
| 5,407,005 | A | * | 4/1995 | Consolacion et al. | .... 152/209.9 |
| 5,996,661 | A | * | 12/1999 | Gerresheim et al. | .... 152/209.28 |
| D505,380 | S | * | 5/2005 | Sugitani et al. | ............ D12/524 |
| D558,125 | S | * | 12/2007 | Miyabe et al. | ............. D12/518 |
| D583,750 | S | * | 12/2008 | Behr et al. | ................. D12/523 |

2008/0236714 A1 * 10/2008 Kojima .................... 152/209.9

FOREIGN PATENT DOCUMENTS

| | | | |
|---|---|---|---|
| EP | 114594 | * | 4/1989 |
| JP | A 7-164829 | | 6/1995 |
| JP | A 8-53004 | | 2/1996 |

(Continued)

*Primary Examiner*—Steven D Maki
(74) *Attorney, Agent, or Firm*—Greer, Burns & Crain, Ltd.

(57) ABSTRACT

Provided is a pneumatic tire in which improvement is achieved in a wet performance and reduction in vehicle exterior noise while ensuring a dry performance. The pneumatic tire has a designated fitting direction relative to a vehicle, in which four main grooves extending in a circumferential direction of the tire are provided on a tread portion, two grooves out of these main grooves are located on each of both sides of a tire equator, five lines of land portions are defined by the main grooves, a center land portion located on the tire equator is a rib which continuously extends in the circumferential direction of the tire without being sectioned, a plurality of arcuate grooves each extending in an arc shape are provided on each of a pair of second land sections located respectively on both sides of the center land section, an end of each of the arcuate grooves is connected to the main groove on an inner side of the vehicle, another end of the arcuate groove is connected to the adjacent arcuate groove, a repeat pitch Po of the arcuate grooves on the second land portion located on an outer side of the vehicle is set greater than a repeat pitch Pi of the arcuate grooves on the second land portion located on the inner side of the vehicle, and a proportion Po/Pi of the pitches is set in a range from 1.5 to 3.0.

5 Claims, 1 Drawing Sheet

FOREIGN PATENT DOCUMENTS

| | | |
|---|---|---|
| JP | A 2000-25421 | 1/2000 |
| JP | B2 3793513 | 9/2003 |
| JP | A 2004-17863 | 1/2004 |
| JP | A 2004-155416 | 6/2004 |
| JP | A 2004-523422 | 8/2004 |
| JP | A 2006-131081 | 5/2006 |
| JP | A 2007-15655 | 1/2007 |
| JP | A 2007-83810 | 4/2007 |

* cited by examiner

PNEUMATIC TIRE WITH TREAD HAVING CIRCUMFERENTIAL GROOVES AND ARCUATE GROOVES

BACKGROUND OF THE INVENTION

The present invention relates to a pneumatic tire with a designated fitting direction relative to a vehicle, or more specifically to a pneumatic tire capable of improving a wet performance and reducing vehicle exterior noise while ensuring a dry performance.

A dry performance of a pneumatic tire is degraded when raising a groove area ratio on a tread portion in order to improve a wet performance of the tire. On the other, vehicle exterior noise tends to be increased when a lug groove component on the tread portion is increased in order to improve the wet performance. Accordingly, it is difficult to satisfy all demands for improvements in the dry performance, the wet performance, and the reduction in vehicle exterior noise at the same time.

Conventionally, in order to achieve a good balance among the dry performance, the wet performance, and the reduction in vehicle exterior noise, there has been proposed a pneumatic tire having a designated rotational direction when being mounted on a vehicle, the pneumatic tire including multiple main grooves formed on a tread portion so as to extend in a circumferential direction of the tire, and multiple sub-grooves inclined from a tread center region toward corresponding shoulder regions mutually in opposite directions relative to the circumferential direction of the tire. Here, a center rib is disposed in the tread center region while shoulder block rows are disposed in the shoulder regions. Moreover, other block rows are disposed inward of the shoulder block regions and shapes and layouts of the sub-grooves are thus defined (see, for example, Japanese patent application Kokai publication No. 7-164829).

Nevertheless, in the reality, the above-described pneumatic tire is not able to sufficiently respond to demands for improvements today. Meanwhile, there have been disclosed various pneumatic tires with a designated fitting direction relative to a vehicle, which are designed to achieve improvements in tire performances based on the designated fitting direction (see, for example, Japanese patent application Kokai publication No. 2007-15655). However, such pneumatic tires also face difficulties to satisfy the demands for improvements in the dry performance, the wet performance, and the reduction in vehicle exterior noise at the same time.

SUMMARY OF THE INVENTION

An object of the present invention is to provide a pneumatic tire which is capable of improving a wet performance and reducing vehicle exterior noise at the same time while ensuring a dry performance.

To attain the object, a pneumatic tire according to the present invention provides a pneumatic tire with a designated fitting direction relative to a vehicle, in which four main grooves extending in a circumferential direction of the tire are provided on a tread portion, two grooves out of these main grooves are located on each of both sides of a tire equator, five lines of land portions are defined by the main grooves, a center land portion located on the tire equator is a rib which continuously extends in the circumferential direction of the tire without being sectioned, a plurality of arcuate grooves each extending in an arc shape are provided on each of a pair of second land sections located respectively on both sides of the center land section, an end of each of the arcuate grooves is connected to the main groove on an inner side of the vehicle, another end of the arcuate groove is connected to the adjacent arcuate groove, a repeat pitch Po of the arcuate grooves on the second land portion located on an outer side of the vehicle is set greater than a repeat pitch Pi of the arcuate grooves on the second land portion located on the inner side of the vehicle, and a proportion Po/Pi of the pitches is set in a range from 1.5 to 3.0.

According to the present invention, in the pneumatic tire with a designated fitting direction relative to a vehicle, the center land portion is defined as the rib while the multiple arcuate grooves are provided on the second land portions so that an end of each of the arcuate grooves is connected to the main groove on the inner side of the vehicle and the other end of the arcuate groove is connected to the adjacent arcuate groove. Moreover, the proportion Po/Pi between the repeat pitch Po of the arcuate grooves at the second land portion on the outer side of the vehicle and the repeat pitch Pi of the arcuate grooves at the second land portion on the inner side of the vehicle is defined in the above-described range. As a result, it is possible to improve the wet performance and reduce the vehicle exterior noise while ensuring the dry performance.

In the present invention, it is preferable that a plurality of lug grooves extending in a width direction of the tire are provided on each of a pair of shoulder land portions located respectively in shoulder regions of the tread portion. These lug grooves on the shoulder land portions contribute to improvement in the wet performance. Moreover, when providing the lug grooves on the shoulder land portions, it is preferable that a thin groove extending in the circumferential direction of the tire is provided on the shoulder land portion on the inner side of the vehicle so as to define a rib between the thin groove and the main groove located at the innermost position on the inner side of the vehicle, the rib extending continuously in the circumferential direction of the tire without being sectioned. That is, when the lug grooves are provided on the shoulder land portions, especially the shoulder land portion on the inner side of the vehicle is apt to be worn unevenly (polygonal wear). However, such uneven wear can be suppressed by the rib disposed at a part of the shoulder land portion on the inner side of the vehicle.

Here, it is preferable to form the lug grooves on the shoulder land portion on the inner side of the vehicle so as to be connected to the thin groove, and to form the lug grooves on the shoulder land portion on the outer side of the vehicle so as to be connected to the main groove located at the outermost position on the outer side of the vehicle. By connecting the lug grooves on the shoulder land portion on the outer side of the vehicle to the main groove located at the outermost position on the outer side of the vehicle as described above, it is possible to improve a drainage performance when the vehicle is turning on a wet road.

It is preferable to set a proportion of a groove width of the main groove located at the outermost position on the outer side of the vehicle to a groove width of the rest of the main grooves in a range from 0.6 to 0.9. Meanwhile, it is preferable to set a proportion of a groove width (a groove width of the narrowest portion) of the lug grooves at the shoulder land portion on the outer side of the vehicle to a groove width (a groove width of the narrowest portion) of the lug grooves at the shoulder land portion on the inner side of the vehicle in a range from 0.6 to 0.9. That is, by setting relatively small groove widths of the main grooves and the lug grooves, on the outer side of the vehicle, having a large influence on the vehicle exterior noise, it is possible to reduce the vehicle exterior noise.

In the present invention, the main groove is a groove having a width in a range from 5 mm to 16 mm and a depth in a range from 5 mm to 12 mm. Meanwhile, the thin groove is a groove having a width in a range from 0.5 mm to 3 mm and a depth in a range from 1 mm to 5 mm. For the lug grooves and the arcuate grooves, groove widths and groove depths are not particularly limited. Here, the groove width means a groove width measured on a tread surface while the groove depth means a maximum depth measured from the tread surface.

DETAILED DESCRIPTION OF THE PREFERRED EMBODIMENTS

Figure 1:
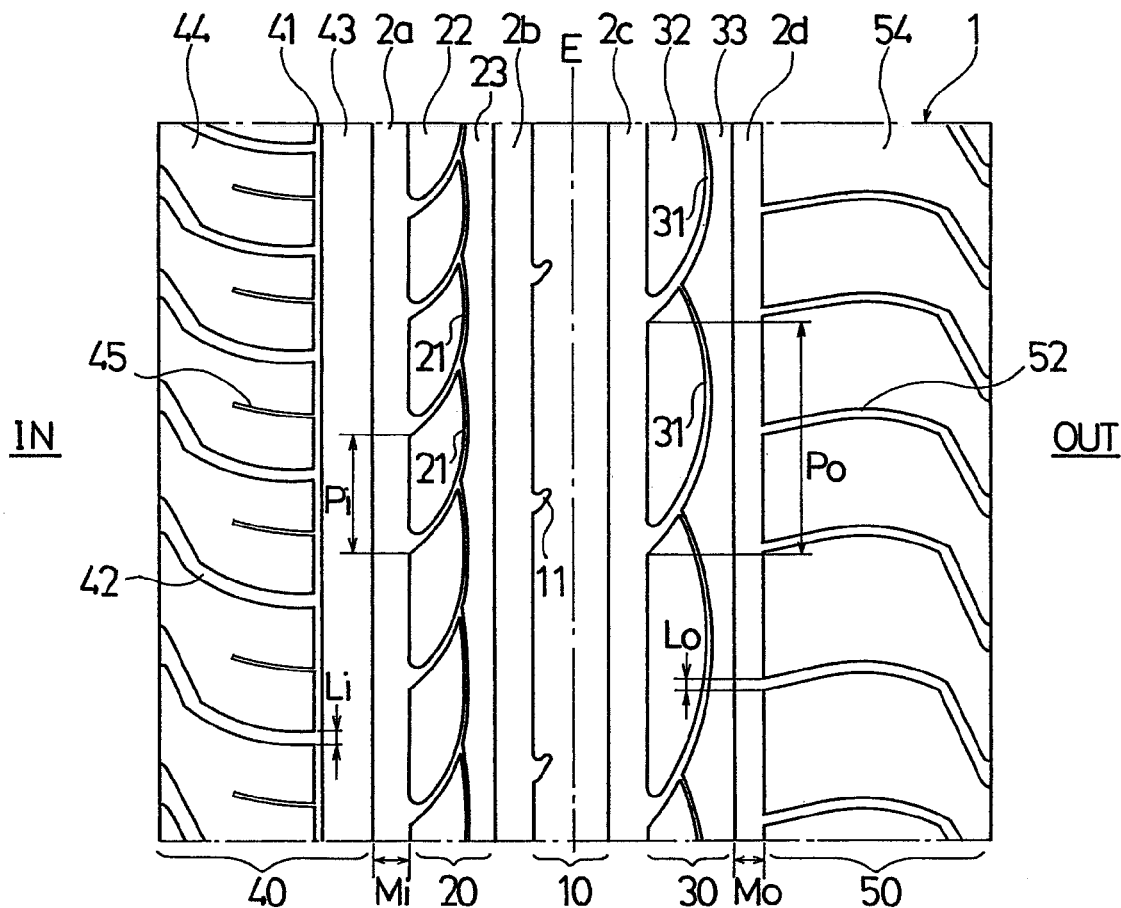
FIG. 1 is a development elevation showing a tread pattern of a pneumatic tire according to an embodiment of the present invention.

Now, a configuration of the present invention will be described below in detail with reference to the accompanying drawing. FIG. 1 is a development elevation showing a tread pattern of a pneumatic tire according to an embodiment of the present invention. A fitting direction relative to a vehicle is designated for the pneumatic tire of this embodiment. In FIG. 1, IN shows an inner side of the vehicle when the tire is mounted to the vehicle while OUT shows an outer side of the vehicle when the tire is mounted to the vehicle.

As shown in FIG. 1, four main grooves $2a$ to $2d$ that extend straight in a circumferential direction of the tire are formed on a tread portion 1. The main grooves $2a$ to $2d$ are disposed, two each, on both sides of a tire equator E. Five rows of land portions 10, 20, 30, 40, and 50 are defined by these main grooves $2a$ to $2d$. That is, the center land portion 10 is located on the tire equator E, the second land portions 20 and 30 are located respectively on both sides of the center land portion 10, and shoulder land portions 40 and 50 are located on shoulder regions of the tread portion 1.

The center land portion 10 is formed of a rib that extends continuously in the circumferential direction of the tire without being sectioned. Multiple notches are formed on the center land portion 10. Each notch 11 has an end connected to the main groove $2b$ on the inner side of the vehicle and the other end terminated within the center land portion 10.

Multiple arcuate grooves 21 extending in an arc shape are formed at the second land portion 20 on the inner side of the vehicle. Each arcuate groove 21 has an end connected to the main groove $2a$ located on the inner side of the vehicle and the other end connected to the arcuate groove 21 adjacent thereto. In this way, multiple blocks 22 are defined between the arcuate grooves 21 and the main groove $2a$ on the inner side of the vehicle, and a rib 23 that extends continuously in the circumferential direction of the tire is defined without being sectioned between the arcuate grooves 21 and the main groove $2b$ located on the outer side of the vehicle.

Meanwhile, multiple arcuate grooves 31 extending in an arc shape are formed at the second land portion 30 on the outer side of the vehicle. Each arcuate groove 31 has an end connected to the main groove $2c$ located on the inner side of the vehicle and the other end connected to the arcuate groove 31 adjacent thereto. In this way, multiple blocks 32 are defined between the arcuate grooves 31 and the main groove $2c$ on the inner side of the vehicle, and a rib 33 that extends continuously in the circumferential direction of the tire is defined without being sectioned between the arcuate grooves 31 and the main groove $2d$ located on the outer side of the vehicle.

A repeat pitch Po of the arcuate grooves 31 at the second land portion 30 on the outer side of the vehicle is set greater than a repeat pitch Pi of the arcuate grooves 21 at the second land portion 20 on the inner side of the vehicle. To be more precise, a proportion Po/Pi is set in a range from 1.5 to 3.0 or more preferably in a range from 2.0 to 2.5. When this pitch variation is applied, the repeat pitches Pi and Po are defined by dividing circumferential lengths of the second land portions 20 and 30 by the numbers of the pitches of the arcuate grooves 21 and 31, respectively. The number of pitches of the arcuate grooves 21 on the tire circumference is preferably set in a range from 48 to 72, while the number of pitches of the arcuate grooves 31 on the tire circumference is preferably set in a range from 24 to 36.

A thin groove 41 extending in the circumferential direction of the tire and multiple lug grooves 42 extending in the width direction of the tire are formed at the shoulder land portion 40 on the inner side of the vehicle. The lug grooves 42 are connected to the thin groove 41. In this way, a rib that extends continuously in the circumferential direction of the tire is defined without being sectioned between the thin groove 41 and the main groove $2a$ located at the innermost position on the inner side of the vehicle, and multiple blocks 44 are defined on the side closer to the shoulder than the thin groove 41. Sipes 45 extending in parallel to the lug grooves 42 and being connected to the thin groove 41 are formed at these blocks 44.

Multiple lug grooves 52 extending in the width direction of the tire are formed at the shoulder land portion 50 on the outer side of the vehicle. The lug grooves 52 are connected to the main groove $2d$ located at the outermost position on the outer side of the vehicle. In this way, multiple blocks 54 are defined on the side closer to the shoulder than the main groove $2d$.

Here, it is possible to add more notches or sipes to the tread portion 1 in order to satisfy required characteristics such as driving stability or wear resistance by controlling rigidities of the respective land portions.

According to the above-described pneumatic tire, the center land portion 10 is defined as the rib. Meanwhile, the second land portions 20 and 30 are provided with the multiple arcuate grooves 21 and 31, in which an end of each of the arcuate grooves 21 and 31 is connected to the main groove located on the inner side of the vehicle while the other end thereof is connected to the adjacent arcuate groove. Moreover, the repeat pitch Po of the arcuate grooves 31 at the second land portion 30 on the outer side of the vehicle and the repeat pitch Pi of the arcuate grooves 21 at the second land portion 20 on the inner side of the vehicle are defined to satisfy the proportion Po/Pi in the appropriate range. Therefore, it is possible to improve the wet performance and reduce the vehicle exterior noise while ensuring the dry performance.

To be more precise, by forming the center land portion 10 as the rib having a higher rigidity than the block rows, it is possible to improve driving stability (stability when traveling straightforward, in particular) on a dry road surface. Meanwhile, by forming the four main grooves $2a$ to $2d$ extending in the circumferential direction of the tire on the tread portion 1, it is possible to ensure an hydrodynamic performance when traveling straightforward.

Moreover, by setting the repeat pitch Po of the arcuate grooves 31 relatively greater, the arcuate grooves 31 at the second land portion 30 on the outer side of the vehicle, it is possible to ensure driving stability on the dry road surface by ensuring the rigidity of the second land portion 30 on the outer side of the vehicle and to ensure driving stability on a wet road surface by ensuring an edge effect against a force in a lateral direction (in the width direction of the tire) on the wet road surface. In the meantime, by setting the repeat pitch Pi of the arcuate grooves 21 relatively smaller, the arcuate grooves 21 at the second land portion 20 on the inner side of the vehicle, it is possible to ensure driving stability on the wet road surface by ensuring an edge effect against a force in a longitudinal direction (in the circumferential direction of the tire) on the wet road surface. Here, the proportion Po/Pi has to be set in the range from 1.5 to 3.0. If this proportion Po/Pi is not in this range, it is not possible to obtain the effect to achieve the dry performance and the wet performance at the same time.

Meanwhile, since one end of each of the arcuate grooves 21 and 31 is connected to the main groove located on the inner side of the vehicle while the other end thereof is connected to the adjacent arcuate groove. Accordingly, it is possible to reduce slapping sounds emitted outside of the vehicle and thereby to reduce the vehicle exterior noise.

In the above-described pneumatic tire, the multiple lug grooves 42 and 52 extending in the width direction of the tire are respectively provided on the pair of shoulder land portions 40 and 50 located in the shoulder regions of the tread portion 1, so that the favorable wet performance is exerted by these lug grooves 42 and 52. At the same time, the thin groove 41 extending in the circumferential direction of the tire is provided at the shoulder land portion 40 on the inner side of the vehicle so as to define the rib 43 between the thin groove 41 and the main groove 2a located at the innermost position on the inner side of the vehicle. It is possible to suppress uneven wear as represented by polygonal wear by locating the rib 43 at a part of the shoulder land portion 40 on the inner side of the vehicle as described above.

Moreover, the lug grooves 42 at the shoulder land portion 40 on the inner side of the vehicle are located to be connected to the thin groove 41 while the lug grooves 52 at the shoulder land portion 50 on the outer side of the vehicle are located to be connected to the main groove 2d located at the outermost position on the outer side of the vehicle. In this way, it is possible to ensure a drainage capability on the outer side of the vehicle sufficiently and thereby to improve the drainage performance when the vehicle is turning on the wet road surface.

In the above-described pneumatic tire, a groove width Mo of the main groove 2d located at the outermost position on the outer side of the vehicle is smaller than a groove width Mi of the rest of the main grooves 2a to 2c, and a proportion Mo/Mi is set in a range from 0.6 to 0.9 or more preferably in a range from 0.7 to 0.8. Here, the main grooves 2a to 2c may have groove widths different from each other. However, in that case, the respective groove widths of the main grooves 2a to 2c and the groove width of the main groove 2d are supposed to satisfy the above-mentioned relation. Meanwhile, a groove width Lo of the lug grooves 52 at the shoulder land portion 50 on the outer side of the vehicle is smaller than a groove width Li of the lug grooves 42 at the shoulder land portion 40 on the inner side of the vehicle, and a proportion Lo/Li is set in a range from 0.6 to 0.9 or more preferably in a range from 0.7 to 0.8. That is, it is possible to reduce the vehicle exterior noise by setting relatively small groove widths for the main groove 2d and the lug grooves 52, located on the outer side of the vehicle, which have a large effect on the vehicle exterior noise. However, the drainage performance will be adversely affected if the groove widths of the main groove 2d and the lug grooves 52 are set too narrow. Therefore, it is required to adjust the groove widths within the above-mentioned ranges.

Although the preferred embodiment of the present invention has been described above in detail, it is to be understood that various other modifications, substitutions, and replacements are possible without departing from the spirit and scope of the present invention as defined in the appended claims.

EXAMPLES

Figure 2:
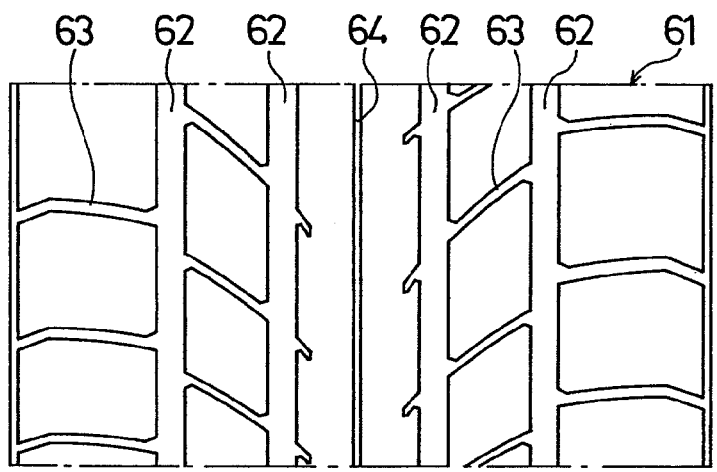
FIG. 2 is a development elevation showing a tread pattern of a conventional pneumatic tire.

Pneumatic tires (Examples 1 to 3 and Comparative Example 1) having a tire size of 245/40R18 and a tread pattern as shown in FIG. 1 and a pneumatic tire (Conventional Example 1) having the same tire size and a tread pattern as shown in FIG. 2 are manufactured. Here, the tread pattern shown in FIG. 2 represents a directional pattern that provides a tread portion 61 with main grooves 62, lug grooves 63, and a thin groove 64.

In Examples 1 to 3 and in Comparative Example 1, the proportion Po/Pi between the repeat pitch Po of the arcuate grooves at the second land portion on the outer side of the vehicle and the repeat pitch Pi of the arcuate grooves at the second land portion on the inner side of the vehicle, the proportion Mo/Mi between the groove width Mo of the main groove located at the outermost position on the outer side of the vehicle and the groove width Mi of the other main grooves, and the proportion Lo/Li between the groove width Lo of the lug grooves at the shoulder land portion on the outer side of the vehicle and the groove width Li of the lug grooves at the shoulder land portion on the inner side of the vehicle are changed as shown in Table 1. Here, in Examples 1 to 3 and in Comparative Example 1, the repeat pitch Po of the arcuate grooves at the second land portion on the outer side of the vehicle is set to the same value. Moreover, in Examples 1 to 3 and in Comparative Example 1, the main grooves other than the main groove located at the outermost position on the outer side of the vehicle are set to the same groove width.

The dry performance, the wet performance, and the vehicle exterior noise of these tires are evaluated in accordance with the following evaluation methods, and results are collectively shown in Table 1.

Dry Performance:

Each test tire is set on a wheel having a rim size of 18×8.5 J and mounted on a test vehicle, and driving stability on a dry road surface is evaluated by feeling with a pneumatic pressure set to 230 kPa. Evaluation results are indicated by 5-point scale with point 3 set as a reference value representing Conventional Example. Here, a higher evaluation value means a superior dry performance.

Wet Performance:

Each test tire is set on the wheel having the rim size of 18×8.5 J and mounted on the test vehicle, and longitudinal traction and lateral grip on a wet road surface are evaluated by feeling with the pneumatic pressure set to 230 kPa. Evaluation results are indicated by 5-point scale with point 3 set as a reference value representing Conventional Example. Here, a higher evaluation value means a superior wet performance.

Vehicle Exterior Noise:

Each test tire is set on the wheel having the rim size of 18×8.5 J and mounted on the test vehicle, and the vehicle exterior noise (in dB) when the vehicle is traveling at a speed of 60 km/h is measured in accordance with JASO C606 with the pneumatic pressure set to 230 kPa. Evaluation results are indicated in the form of a difference from a value in Conventional Example defined herein as a reference value. Here, a negative value means less vehicle exterior noise than the reference value.

TABLE 1

| | | CONVENTIONAL EXAMPLE | COMPARATIVE EXAMPLE 1 | EXAMPLE 1 | EXAMPLE 2 | EXAMPLE 3 |
|---|---|---|---|---|---|---|
| Po/Pi | | — | 1.0 | 2.0 | 2.0 | 3.0 |
| Mo/Mi | | — | 0.8 | 0.8 | 0.6 | 0.8 |
| Lo/Li | | — | 0.8 | 0.8 | 0.6 | 0.8 |
| DRY PERFORMANCE | DRIVING STABILITY | 3 | 3 | 3 | 3.25 | 3 |
| WET PERFORMANCE | LONGITUDINAL TRACTION | 3 | 2.75 | 3.25 | 3 | 3.50 |
| | LATERAL GRIP | 3 | 3.50 | 3.50 | 3.25 | 3.50 |
| VEHICLE EXTERIOR NOISE | DIFFERENCE FROM REFERENCE VALUE | — | −0.6 dB | −0.6 dB | −1.0 dB | −0.6 dB |

As apparent from this Table 1, the tires in Examples 1 to 3 can improve the wet performance and reduce the vehicle exterior noise while ensuring the dry performance in comparison with Conventional Example. On the contrary, Comparative Example shows insufficient longitudinal traction on the wet road surface as a result of setting the proportion Po/Pi equal to 1.0.

What is claimed is:

1. A pneumatic tire with a designated fitting direction relative to a vehicle,
wherein four main grooves extending in a circumferential direction of the tire are provided on a tread portion, the tread portion having an inner side and an outer side when the tire is mounted on the vehicle,
two grooves out of these main grooves are located on each of both sides of a tire equator,
five lines of land portions are defined by the main grooves,
a center land portion located on the tire equator is a rib which continuously extends in the circumferential direction of the tire without being sectioned,
a plurality of arcuate grooves each extending in an arc shape are provided on each of a pair of second land portions located respectively on both sides of the center land portion,
an end of each of the arcuate grooves on the second land portion located on the inner side of the tread portion is connected to the innermost main groove on the inner side of the tread portion while another end of the arcuate groove is connected to the adjacent arcuate groove,
an end of each of the arcuate grooves on the second land portion located on the outer side of the tread portion is connected to the main groove between the center land portion and the second land portion located on the outer side of the tread portion while another end of the arcuate groove is connected to the adjacent arcuate groove,
a repeat pitch Po of the arcuate grooves on the second land portion located on an outer side of the tread portion is set greater than a repeat pitch Pi of the arcuate grooves on the second land portion located on the inner side of the tread portion, and
a proportion Po/Pi of the pitches is set in a range of from 1.5 to 3.0,
wherein a plurality of lug grooves extending in a width direction of the tire are provided on each of a pair of shoulder land portions located respectively in shoulder regions of the tread portion.

2. The pneumatic tire according to claim 1,
wherein a thin groove extending in the circumferential direction of the tire is provided on the shoulder land portion on the inner side of the tread portion so as to define a rib between the thin groove and the main groove located at the innermost on the inner side of the tread portion, the rib extending continuously in the circumferential direction of the tire without being sectioned.

3. The pneumatic tire according to claim 2,
wherein the lug grooves on the shoulder land portion on the inner side of the tread portion are formed so as to be connected to the thin groove, and
the lug grooves on the shoulder land portion on the outer side of the tread portion are formed so as to be connected to the main groove located at the outermost position on the outer side of the tread portion.

4. The pneumatic tire according to any one of claims 1 to 3,
wherein a proportion of a groove width of the main groove at the outermost position on the outer side of the tread portion to a groove width of the rest of the main grooves is set in a range from 0.6 to 0.9.

5. The pneumatic tire according to claim 1,
wherein a proportion of a groove width of the lug grooves at the shoulder land portion on the outer side of the tread portion to a groove width of the lug grooves at the shoulder land portion on the inner side of the tread portion is set in a range from 0.6 to 0.9.

* * * * *